United States Patent [19]

Arimoto

[11] Patent Number: 4,523,249
[45] Date of Patent: Jun. 11, 1985

[54] ALTERNATING CURRENT LIMITING APPARATUS

[75] Inventor: Satomi Arimoto, Nishinomiya, Japan

[73] Assignee: Mitsubishi Denki Kabushiki Kaisha, Tokyo, Japan

[21] Appl. No.: 531,644

[22] Filed: Sep. 13, 1983

[30] Foreign Application Priority Data

Sep. 21, 1982 [JP] Japan ................ 57-165532

[51] Int. Cl.$^3$ .............................. H02H 9/02
[52] U.S. Cl. ....................... 361/58; 307/51; 361/11
[58] Field of Search ............. 361/10, 11, 58, 63, 361/113; 323/355, 362; 307/20, 51

[56] References Cited

U.S. PATENT DOCUMENTS

| | | | |
|---|---|---|---|
| 2,202,716 | 5/1940 | Partington | 361/58 X |
| 2,310,066 | 2/1943 | Currier | 361/58 |
| 3,356,901 | 12/1967 | Krämer et al. | 361/58 |
| 3,745,416 | 7/1973 | Thanawala | 361/58 |
| 3,881,137 | 4/1975 | Thanawala | 361/58 X |
| 4,158,864 | 6/1979 | Kennon | 361/58 |
| 4,165,527 | 8/1979 | Paice | 361/58 X |

FOREIGN PATENT DOCUMENTS

| | | | |
|---|---|---|---|
| 50-78850 | 6/1975 | Japan . | |
| 1108609 | 4/1968 | United Kingdom | 361/58 |
| 1108608 | 4/1968 | United Kingdom | 361/58 |
| 1131504 | 10/1968 | United Kingdom | 361/58 |
| 1333380 | 10/1973 | United Kingdom | 361/58 |
| 604078 | 4/1978 | U.S.S.R. | 361/11 |

OTHER PUBLICATIONS

"Short-Circuit Limiter Offers Flexibility", Electrical World, 1/5/70, pp. 50-51.

*Primary Examiner*—Harry E. Moose, Jr.
*Attorney, Agent, or Firm*—Wenderoth, Lind & Ponack

[57] ABSTRACT

An alternating current limiting apparatus is disclosed which includes first, second, and third circuit. The first circuit is formed of a winding means such as transformer, autotransformer, or reactor and a capacitor serially connected to the winding means and is connected between two different kinds of power systems. The second circuit is formed of a series combination of a closing device composed of, e.g. a gap, mechanical or semiconductor switch, or a non-linear resistive element, and a resistor. The second circuit is connected across the output terminals of the winding means. The third circuit is formed of a reactor and a second resistor serially connected to the reactor. The third circuit is connected in parallel with the first circuit. The closing device is normally kept in its open state to form a series resonance circuit of the transformer and the capacitor, thereby directly interconnecting the systems with null impedance therebetween. Upon a system fault, the closing device is closed to switch the impedance as seen from the primary side of the winding means over to a small value to detune the series resonance, thereby forming a parallel resonance circuit between the combination of the small impedance with the capacitor and the third circuit including the reactor to enlarge the total impedance between the systems so that an overcurrent therebetween due to the fault may be suppressed.

5 Claims, 8 Drawing Figures

ALTERNATING CURRENT LIMITING APPARATUS

BACKGROUND OF THE INVENTION

This invention relates to an apparatus for limiting a transient fault overcurrent which occurs upon a fault such as a ground fault or a line shortcircuit within a power system or between different power systems such as between AC power distribution lines or AC power transmission lines, and in particular to an AC current limiting apparatus (hereinafter called a current limiting apparatus) wherein upon the occurrence of the above faults, the acceleration of a generator is suppressed to improve a transient stability and to protect equipment within a power system, or a required breaking capacity of a circuit breaker and in turn the duty of power transmission or distribution equipment is reduced by limiting the current to be interrupted.

Tuned current limiting apparatuses are known where circuit systems are used as shown in FIGS. 1 and 2 which, for convenience's sake, respectively illustrate only one phase of a current limiting apparatus, generally designated by a reference numeral 10, and which is connected between interconnecting junctions a and b of two different kinds of power systems S1 and S2.

In FIG. 1, the current limiting apparatus 10 is formed of an air core or iron core type reactor 12, a capacitor 14 serially connected to the reactor 12, a closing device 16 connected in parallel with the capacitor 14, and a resistor 18 connected in series with the closing device 16 across the capacitor 14, where the closing device 16 comprises a gap, a mechanical or semiconductor device, or a non-linear resistive element. Japanese Pat. No. 987,109 issued on Feb. 21, 1980, which corresponds with the U.S. Pat. application Ser. No. 411,888 by John Rosa et al., particularly discloses the use of SCRs as a semiconductor type closing device.

In operation of the circuit in FIG. 1, normally the systems S1 and S2 are substantially at the same potential and so the terminal voltage across the capacitor 14 is at an extremely low level. Therefore the closing device 16 is disposed in its state to form a series resonance circuit, of the reactor 12 and the capacitor 14, which is tuned with the line frequency of the systems S1 and S2. On this occasion, the systems S1 and S2 are interconnected with null impedance of the current limiting apparatus 10. However, when a fault occurs such that a transient overcurrent flows between the systems S1 and S2, the terminal voltage across the capacitor 14 is rapidly increased, at which time, the capacitor 14 is discharged automatically if the closing device 16 is a gap, or by means of an external control if the closing device 16 is a mechanical or semiconductor switch, or through an electrical path formed by the automatic reduction to zero of impedance if the closing device 16 is a non-linear resistive element. This closing action of the closing device 16 electrically interconnects the systems S1 and S2 through the reactor 12 and the resistor 18 to suppress the overcurrent which flows through the systems S1 and S2 if the impedance of the reactor 12 is large as previously selected.

FIG. 2 shows another prior art current limiting apparatus, generally designated by reference numeral 10', comprising a bridged circuit arrangement using two sets of reactors 12 and 12A as well as capacitors 14 and 14A across bridging junctions c and d between which the closing device 16 and the resistor 18 are serially inserted, while the circuit of FIG. 1 is arranged with the combination of one set of the reactor 12 and the capacitor 14.

In operation of the circuit in FIG. 2, normally the systems S1 and S2 are substantially at the same potential and so the potential difference between the bridging junctions c and d is low. Therefore, the closing device 16 is disposed in its open state to form two sets of series resonance circuits consisting of the reactor 12 and the capacitor 14 as well as the reactor 12A and the capacitor 14A, each of which is tuned with the line frequency of the systems S1 and S2. In this case, both of these two sets of series resonance circuits have approximately zero impedance for directly interconnecting the systems S1 and S2. When a fault occurs such that a transient overcurrent flows through the systems S1 and S2, the potential difference between the bridging junctions c and d is rapidly increased causing the closing device 16 to be actuated, which bridges the junctions c and d, which forms two sets of parallel resonance circuits consisting of the reactor 12 and the capacitor 14A as well as the reactor 12A and the capacitor 14, whereby the systems S1 and S2 are interconnected via a large impedance (the impedance will be infinite if the combined resistance of the closing device 16 and the resistor 18 is zero), so that the overcurrent which flows between the systems S1 and S2 is suppressed.

Although it is advantageous that such a conventional series resonance type current limiting apparatus as in FIG. 1 has a simple arrangement and can be made cheaply, it has the following characteristic defects. Namely, first of all, since the limited current is inductive or lags in phase behind the voltage so that the restriking voltage upon the circuit interruption becomes high, a restriking voltage suppressing device or a circuit breaker with a good withstanding restriking voltage characteristics is additionally required. Secondly, the large inductance which is previously provided for the reactor 12 for enhancing the current limiting effects will raise the terminal voltage across the reactor 12 upon normal or fault occasions and so that the dielectric strength of the reactor 12 will have to be increased. Also, the addition of a restriking voltage suppressing device or a circuit breaker with a much better withstanding restriking voltage characteristics will be required. Thirdly, if the closing device 16 is composed of a non-linear resistive element, a discharging resistor or reactor etc will have to be provided since the capacitor 14 remain charged.

Further in such a series-parallel resonance type apparatus as in FIG. 2, since it has an opposite feature to the aforementioned series resonance type apparatus and the limited current is substantially resistive in phase with voltage, it is advantageous in that the transient stability of the systems is improved and the breaking duty for a circuit breaker is lightened because of the low restriking voltage upon the circuit interruption. However, the circuit arrangement is complicated and therefore expensive, compared to the series resonance type apparatus in FIG. 1. Moreover, although there is no problem when the inductance values of the reactors 12 and 12A are identical and the capacitance values of the capacitors 14 and 14A are also identical, the presence of component variations, if the variations are considerable, will cause a high circulating current to flow through the current limiting apparatus, and will disturb the resonance conditions. Finally, if the closing device 16 is composed of a non-linear resistive element, the capacitors 14 and 14A remain charged in this case either, so that a discharging resistor or reactor etc will disadvantageously have to be provided.

It is accordingly an object of the invention to provide a current limiting apparatus without the defects of the prior art as set forth above.

SUMMARY OF THE INVENTION

The present invention provides an alternating current limiting apparatus comprising first, second, and third circuits. The first circuit is formed of a series combination, of a capacitor and a winding means, provided between two different kinds of power systems. The second circuit is formed of a series combination, of a first resistor and a closing device, connected across the output terminals of said winding means. The third circuit is formed of a series combination, of a reactor and a second resistor, connected in parallel with the first circuit. The closing device of the second circuit is normally kept in its open state to form a series resonance circuit of the winding means and the capacitor and to interconnect the systems with null resultant impedance of the first circuit. On the other hand, upon system faults the closing device is closed to switch the impedance seen from the input terminals of the winding means over to a predetermined small value to detune the resonance point of the series resonance circuit. This forms a parallel resonance circuit between the combination of the predetermined small impedance with the capacitor and the third circuit to enlarge the total impedance value between the systems, resulting in a suppressed overcurrent therebetween.

The winding means preferably comprises a transformer, an autotransformer, or a second reactor the output terminals of which are connected in parallel with the second circuit of the first resistor and the closing device. Each component of the current limiting apparatus preferably has a suitable component value in accordance with the predetermined theoretical relationships.

BRIEF DESCRIPTION OF THE DRAWINGS

For a better understanding of the invention, reference may be had to the preferred embodiments exemplary of the invention shown in the accompanying drawings in which.

Throughout the Figures, the same reference numerals indicate identical or corresponding portions.

DETAILED DESCRIPTION OF THE PREFERRED EMBODIMENTS

Figure 3:
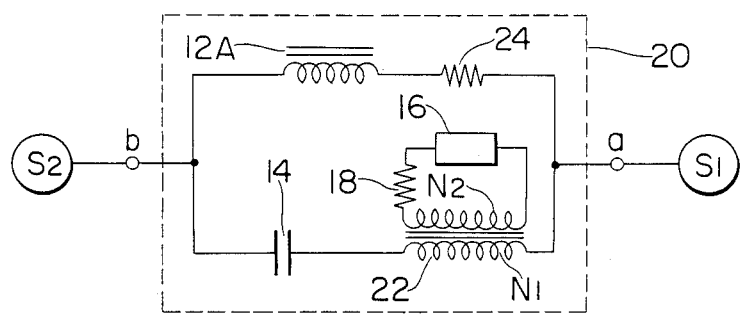
FIG. 3 shows the circuit diagram of one embodiment of an AC current limiting apparatus in accordance with the present invention.

Referring to the drawings, in particular FIG. 3, there is shown a first embodiment of a current limiting apparatus, generally designated by a reference numeral 20, in accordance with the present invention.

In FIG. 3, the current limiting apparatus 20 is connected between the power systems S1 and S2 and composed of first, second, and third circuit. The first circuit is formed of a transformer 22 as a winding means, and the capacitor 14 serially connected to the primary winding N1 of the transformer 22. The second circuit is formed of a series combination, of a closing device 16 and a resistor 18, connected across the secondary winding N2 of the transformer 22. The third circuit is formed of a reactor 12A and a resistor 24 serially connected to the reactor 12A. The first circuit is connected in parallel with the third circuit between the systems S1 and S2. As set forth in the prior art in FIGS. 1 and 2, the closing device 16 may be a gap, a semiconductor device, or a non-linear resistive element.

In operation of the current limiting apparatus according to the present invention thus constructed, since the potentials of these two kinds of systems S1 and S2 are normally substantially the same, the terminal voltage across the secondary winding N2 of the transformer 22 is so low that the closing device 16 may not be actuated or closed. Therefore, the closing device 16 is disposed in its open state, thereby forming a series resonance circuit consisting of the primary winding N1 of the transformer 22 and the capacitor 14. This series resonance circuit performs a tuned operation for the line frequency of the systems S1 and S2. On this occasion, the total impedance of the current limiting apparatus 20 is substantially null to directly interconnect the systems S1 and S2.

When a transient overcurrent flows through the systems S1 and S2 upon the occurrence of a fault, the terminal voltage across the secondary winding N2 of the transformer 22 is rapidly increased. Then the closing device 16 is actuated such that it is closed by the automatic discharge thereacross if it comprises a gap, by an external control means if it comprises a mechanical switch or a semiconductor switch as disclosed in the above-noted Japanese Pat. No. 987,109, or by the impedance being automatically reduced to zero if it comprises a non-linear resistive element. This impedance drop to zero as seen from the primary side of the transformer 22 detunes the resonance point of the series resonance circuit consisting of the transformer 22 and the capacitor 14. Therefore, a parallel resonance circuit is now formed between the series combination of the relatively small resistance of the resistor 18 as seen from the primary side of the transformer with the capacitance of the capacitor 14 of the first circuit, and the series combination of the reactor 12A and the resistor 24 of the third circuit. In this case, if the resistances of the resistors 18 and 24 are substantially zero, then the total impedance of the current limiting apparatus 20 will be infinite, while if those resistances are not substantially zero, then the total impedance will not be infinite but large, thereby suppressing the overcurrent flowing through the systems S1 and S2 in either case.

The theoretical operation of the above circuit operation will now be described in detail.

It is now assumed that a leakage inductance due to the leakage fluxes and the resistance in the primary and secondary windings N1 and N2 of the transformer 22 be neglected and that the magnetic resistance of the iron core of the transformer 22 be deemed as a linear circuit. During the normal condition where the secondary side of the transformer 22 is made open, the impedance $Z_T$ as seen from the primary winding N1 of the transformer 20, and the impedance $Z_{ab}$ across the interconnecting junctions a and b of the current limiting apparatus 20 are given:

$$\dot{Z}_T = j \frac{\omega n_1^2}{r_{mag}} \tag{1}$$

$$\dot{Z}_{ab} = \cfrac{1}{\cfrac{1}{r_3 + j\omega L_3} + \cfrac{1}{j\omega \cfrac{n_1^2}{r_{mag} + \cfrac{j\omega n_2^2}{r_2}} + \cfrac{1}{j\omega \cdot c}}}$$

$$= \cfrac{1}{\cfrac{r_3}{r_3^2 + \omega^2 \cdot L_3^2} + \cfrac{\alpha}{\alpha^2 + \left(\beta - \cfrac{1}{\omega \cdot c}\right)^2} - j\left\{\cfrac{\omega \cdot L_3}{r_3^2 + \omega^2 \cdot L_3^2} - \cfrac{\left(\cfrac{1}{\omega \cdot c} - \beta\right)}{\alpha^2 + \left(\beta - \cfrac{1}{\omega \cdot c}\right)^2}\right\}}$$

wherein:
$\omega$; angular line frequency,
$n_1$; No. of turns in the primary winding N1 of the transformer 22,
$r_{mag}$; magnetic resistance of the iron core of the transformer 22, $$\dot{Z}_{ab} = j \cfrac{\left(\cfrac{\omega \cdot n_1^2}{r_{mag}} - \cfrac{1}{\omega c}\right) \cdot (r_3 + j\omega \cdot L_3)}{r_3 + j\omega \left(L_3 + \cfrac{n_1^2}{r_{mag}} - \cfrac{1}{\omega \cdot c}\right)} \tag{2}$$

where:
c; capacitance of the capacitor 14,
$r_3$; resistance of the resistor 24,
$L_3$; inductance of the reactor 12A.
If $$\frac{\omega \cdot n_1^2}{r_{mag}} = \frac{1}{\omega \cdot c} \tag{3}$$

namely, if the transformer 22 and the capacitor 14 in the first circuit form a series resonance circuit, then $$Z_{ab} = 0 \tag{4}$$

so that the total impedance between the interconnecting junctions a and b of the current limiting apparatus 20 has a zero value which directly interconnects the systems S1 and S2.

When an overcurrent flows through the systems S1 and S2 upon the occurrence of a fault, the terminal voltage across the secondary winding N2 of the transformer 22 is rapidly increased and then the closing device 16 is actuated. Then the second circuit is closed, and the impedance $Z_T'$ as seen from the primary winding N1 of the transformer 22 and the impedance $Z'_{ab}$ between the interconnecting junctions a and b of the current limiting apparatus 20 are given:

$$\dot{Z}_T = j\omega \cfrac{n_1^2}{r_{mag} + \cfrac{j\omega \cdot n_2^2}{r_2}} \tag{5}$$

where:
$n_2$; No. of turns in the secondary winding N2 of the transformer 22,
$r_2$; resistance of the resistor 18,
therefore $$\dot{Z}_{ab} = \cfrac{1}{\cfrac{1}{r_3 + j\omega L_3} + \cfrac{1}{j\omega \cfrac{n_1^2}{r_{mag} + \cfrac{j\omega n_2^2}{r_2}} + \cfrac{1}{j\omega \cdot c}}} \tag{6}$$

where:

$$\alpha = \frac{\omega^2 \cdot r_2 \cdot n_1^2 \cdot n_2^2}{r_2^2 \cdot r_{mag}^2 + \omega^2 \cdot n_2^4}, \quad \beta = \frac{\omega \cdot r_2^2 \cdot r_{mag} \cdot n_1^2}{r_2^2 \cdot r_{mag}^2 + \omega^2 \cdot n_2^4}$$

and from Equations (3) and (6), if the condition that $$\frac{\omega \cdot L_3}{r_3^2 + \omega^2 \cdot L_3^2} = \omega \cdot c \tag{7}$$

and $$\omega \cdot L_3 \gg r_3 \tag{8}$$

is fulfilled, then Equation (7) may be rewritten as $$\omega^2 \cdot L_c \cdot 3 \simeq 1 \tag{9}$$

so that the capacitor 14 and the reactor 12A forming the third circuit form a parallel resonance circuit. Therefore, from Equations (3), (6) and (9)

$$\dot{Z}_{ab} = \cfrac{1}{\cfrac{r_3}{r_3^2 + \omega^2 \cdot L_3^2} + \cfrac{r_2 \cdot c}{n_2^2}} \tag{10}$$

The denomination is expressed by the following resistive value:

$$\frac{r_3}{r_3^2 + \omega^2 \cdot L_3^2} + \frac{r_2 \cdot c}{n_2^2} \tag{11}$$

Therefore, when $r_2 \simeq r_3 \simeq 0$, $Z'_{ab} = \infty$ so that the total impedance of the current limiting apparatus 20 is infinite, or when Equation (8) is established and $$r_2 \cdot c / n_2^2 \simeq 0,$$

$$Z'_{ab} \gg 0 \quad (12)$$

which indicates the interconnection between the systems S1 and S2 with a large impedance. It can therefore be seen that the overcurrent flowing through the systems S1 and S2 is suppressed. Provided that the potential difference between the systems S1 and S2 be Vab, the suppressed or limited current I'ab is given from Equation (10)

$$I'_{ab} = V_{ab} \cdot \left[ \frac{r_3}{r_3^2 + \omega^2 \cdot L_3^2} + \frac{r_2 \cdot c}{n_2^2} \right] \quad (13)$$

This limited current I'ab is a resistive one in phase with the potential difference Vab as seen from Equation (13). This resistive current, as described above, provides a satisfactory transient stability for the systems S1 and S2, and also advantageously lightens the breaking duty of a circuit breaker because of the low restriking voltage upon the circuit interruption, i.e. breaking occasion.

The effects of the second and first resistors 18 and 24 respectively inserted in the second and third circuits will now be described.

As set forth above, when $r_2 \simeq 0$ and $r_3 \simeq 0$, the total impedance Z'ab of the current limiting apparatus 20 becomes infinite and therefore the limited current I'ab$\simeq$0 as seen from Equation (13). This results from the solution in a steady state as opposed to a transient one. When $r_2 \simeq 0$ and $r_3 \simeq 0$ by a computer simulation or transient solution, the following disadvantages arise. Namely, upon the occurrence of a fault, excessive electrical energy is mutually injected between the first circuit formed of the transformer 22 and the capacitor 14, the second circuit of the resistor 18 and the closing device 16, and the third circuit formed of the resistor 24 and the reactor 12A, for example, the transformer 22 and the reactor 12A being stored with an inductive energy due to the inductance thereof and the capacitor 14 being stored with a capacitive energy so that a pulsating current including a DC component having a frequency corresponding to the inductance and capacitance values of the current limiting apparatus 20 flows. Therefore, in the case where the resistors 18 and 24 have small resistances, it will take a considerable time for the injected energy to be thermally dissipated and so will do for the damping of the pulsating current. If the above frequency is high, a protective relay for a fault detection inserted in the systems S1 and S2 may malfunction. Also if the DC component is large and the damping time is long, it will take a long time for the limited current to reach a zero crossing for the disconnection of the systems S1 and S2, resulting in a long standby time for the zero current interruption. Even after the circuit interruption of the systems S1 and S2, the current continues to flow through the closed circuit of the current limiting apparatus 20. If the resistance of the resistor 18 is small, upon the actuation of the closing device 16 a rush current flows therein, which weights the electrical and mechanical duty for the electrical conduction of the closing device 16. Furthermore, when the systems are electrically interconnected, an electrical energy is stored into the closed circuit of the first circuit formed of the transformer 22 and the capacitor 14 as well as the third circuit formed of the reactor 12A and the resistor 24 to cause a pulsating current to flow therethrough which includes a DC component having a frequency corresponding to the inductance and capacitance values of the current limiting apparatus 20, as described above. Therefore it will take a long time for the injected energy to be thermally dissipated if the resistance of the resistor 24 is small and in turn for the pulsating current to be damped, with such a disadvantageous result that a beat voltage long continues to be provided across the interconnecting junctions a and b of the current limiting apparatus 20. In order to remove such a disadvantage, the resistors 18 and 24 are provided with a suitable resistance value respectively, although the current limiting effect is somewhat reduced.

Figure 4:
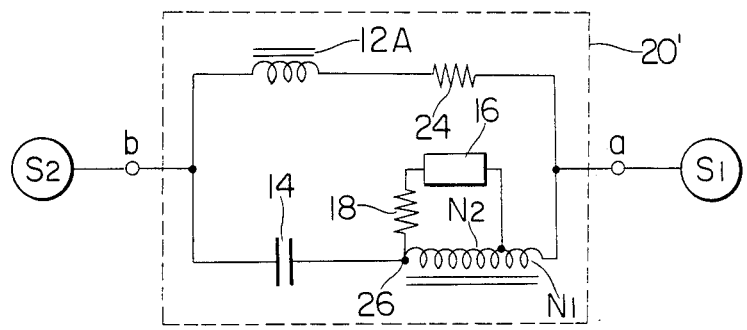
FIG. 4 shows the circuit diagram of another embodiment of an AC current limiting apparatus in accordance with the present invention.

FIG. 4 shows the second embodiment of a current limiting apparatus, generally designated by a reference numeral 20', according to the present invention, in which only an autotransformer 26 as a winding means is substituted for the transformer 22 shown in FIG. 3. In this embodiment, the primary (series+shunt) winding N1 of the autotransformer 26 forms a first circuit with the capacitor 14 and the secondary (shunt) winding N2 forms a second circuit with the series combination of the closing device 16 and the resistor 18.

Figure 1:
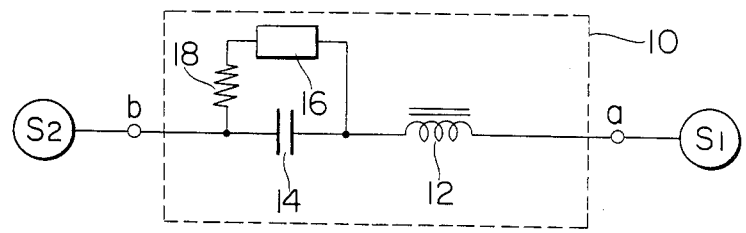
FIG. 1 shows the circuit diagram of a prior art AC current limiting apparatus of a series resonance type.
Figure 2:
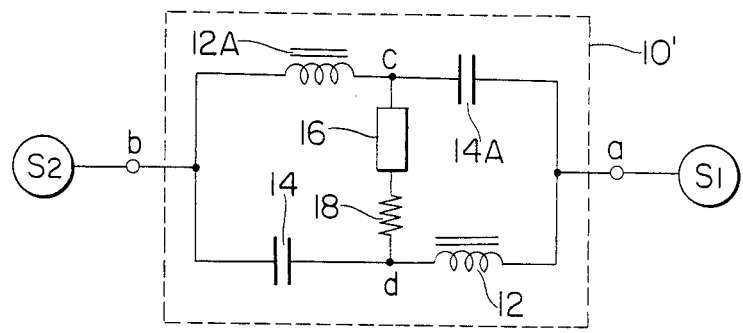
FIG. 2 shows the circuit diagram of another prior art AC current limiting apparatus of a series-parallel resonance type.
Figure 5:
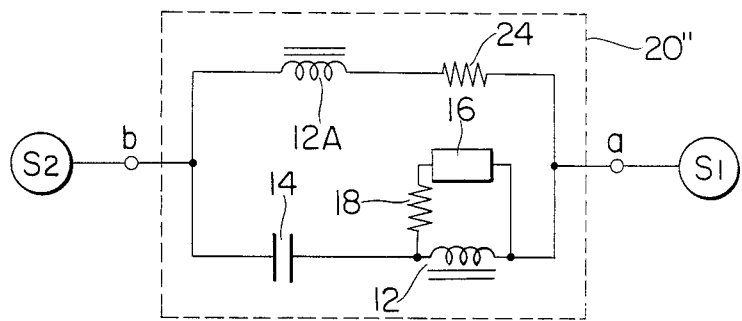
FIG. 5 shows the circuit diagram of still another embodiment of an AC current limiting apparatus in accordance with the present invention.

FIG. 5 shows the third embodiment of a current limiting apparatus, generally designated by a reference numeral 20'', according to the present invention, in which a reactor 12 for a winding means as used in FIGS. 1 and 2 is only substituted for the transformer 22 in FIG. 3. In this embodiment, the primary and secondary windings are commonly used for one winding means.

It will be appreciated by any one skilled in the art that even with the circuits of FIGS. 4 and 5 similar circuit function and effect to FIG. 3 are obtained according to Equations (1)–(13).

Figure 6:
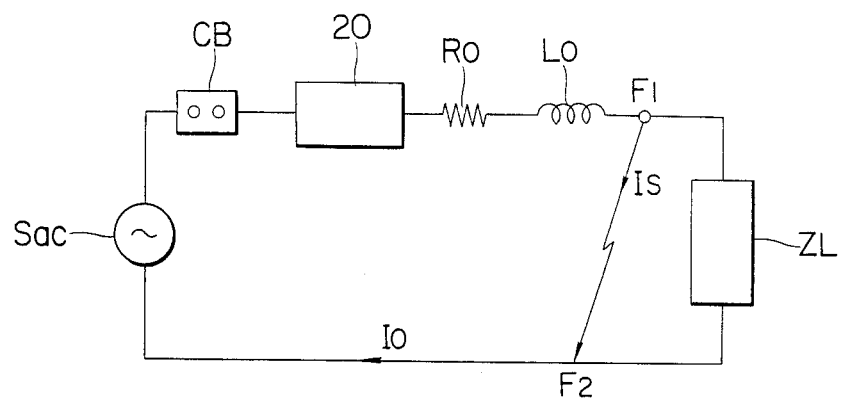
FIG. 6 shows a mimic circuit diagram incorporating the AC current limiting apparatus of the present invention.

FIG. 6 shows an example of a circuit incorporating the current limiting apparatus 20 of the present invention, in which a circuit breaker CB, the current limiting apparatus 20, a line resistance Ro, a line inductance Lo, and a load ZL are serially connected to each other across an AC power source Sac.

Figure 7:
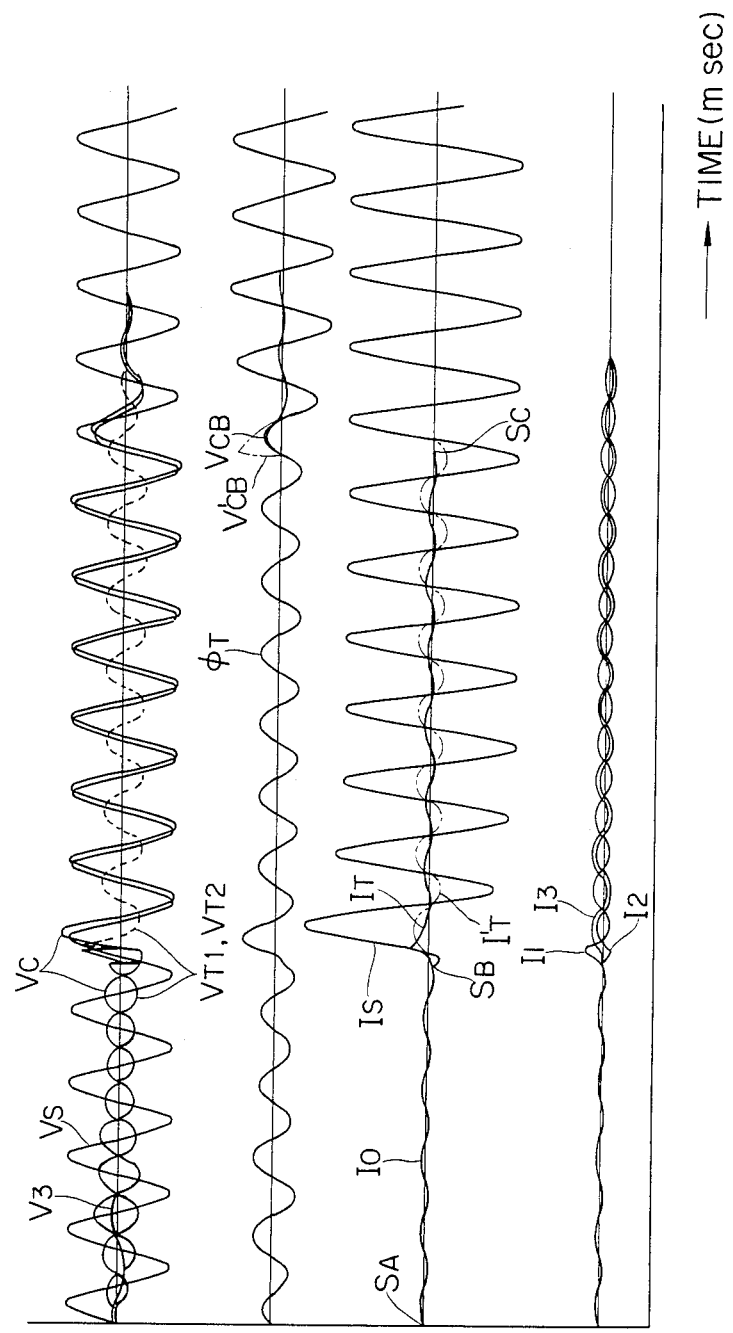
FIGS. 7 and 8 show characteristic waveforms as a result of computer simulation of the mimic circuit in FIG. 6.
Figure 8:
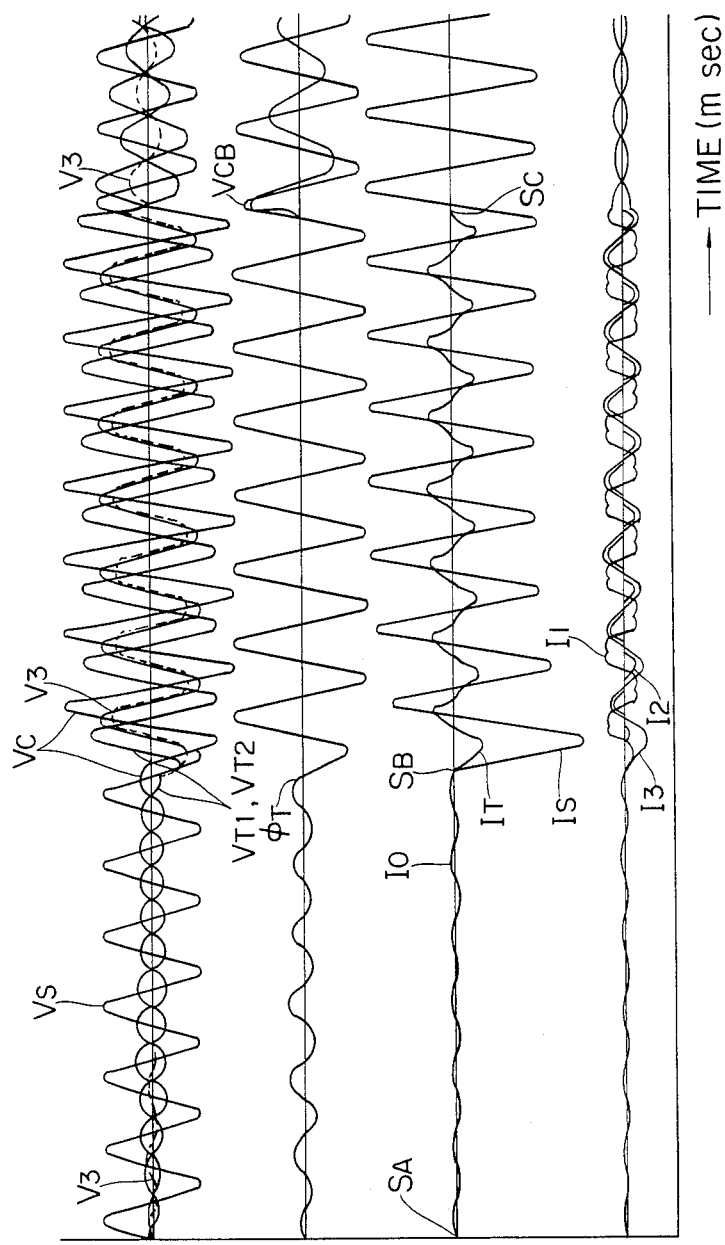

FIGS. 7 and 8 respectively show simulated waveforms versus time obtained at various points in the circuit of FIG. 6 by means of a computer, in which FIG. 7 employs the closing device 16 in the form of a gap while FIG. 8 employs the same in the form of a non-linear resistive element.

In FIGS. 7 and 8, Vs, Vc, V3, VT1, and VT2 shown in the top graph represent the simulated voltage waveforms of the power source Sac, across the terminals of the capacitor 14 of the current limiting apparatus 20, across the terminals of the third circuit formed of the reactor 12A and the resistor 24, across the terminals of the primary and secondary windings of the transformer 22, respectively. $\phi_T$ and VCB shown in the second graph from the top represent the simulated waveform of the magnetic flux in the iron core of the transformer 22 and of the voltage across the electrodes of the circuit breaker CB, respectively. $I_O$, $I_S$, and $I_T$ shown in the second graph from bottom represent the simulated current waveforms of normal condition in the circuit of FIG. 6, of a shortcircuit across shorcircuit fault points F1 and F2 in the case where no current limiting apparatus is used, and of the limited current in FIG. 6, respectively. It is to be noted that SA, SB, and SC shown in the same graph represent the initiation point of electrical conduction, the shortcircuit occurrence point, and the interruption completion point, respectively. I1, I2, and I3 shown in the bottom graph represent the simulated current waveforms of the first, second, and third circuit in the current limiting apparatus 20 in FIG. 6, respectively.

Also in FIG. 7 are shown V'CB and I'$_T$ shown by dot and dash lines which respectively represent the simulated waveform of the voltage across the electrodes of the circuit breaker CB and the simulated current waveform of the limited current in FIG. 6 when the circuit arrangement of the prior art of FIG. 1 is used for the circuit of FIG. 6. It will be appreciated that the prior art circuit reveals a steep voltage waveform V'CB at the interruption completed point SC, compared to those of the present invention, resulting in a harder circuit interruption, and reveals a current waveform I'$_T$ in phase with the shortcircuit waveform I$_S$ which is a complete inductive current waveform.

As set forth heretofore, in accordance with the present invention a favourable transient stability is provided for power systems because of the resistive limited current while at the same time the breaking duty of a circuit breaker may be lightened because of the low restriking voltage upon the circuit interruption. Also, since the circulation current in the current limiting apparatus of the present invention after the circuit interruption damps for a short time as described above with regard to the function of the resistors 18 and 24, it is advantageous that no addition of a discharging resistor or reactor is needed for the capacitor. It is also advantageous that the secondary side of the transformer as used for a winding means can be used for a low-voltage circuit so that the closing device may be controlled in a low voltage manner if the closing device is a mechanical or semiconductor switch. It is further advantageous that as compared to such a conventional series-parallel resonance type apparatus as shown in FIG. 2, the capacitor 14A may be omitted to provide a cheap apparatus because in an L-C resonance type current limiting apparatus the cost of such a capacitor is given much weight as a whole. In particular the second embodiment shown in FIG. 4 may advantageously save the quantity of copper or iron of the winding, as compared to the embodiment in FIG. 3. Furthermore, in the third embodiment shown in FIG. 5, the specifications of the reactor 12 may be the same as those of the reactor 12A of the third circuit so that the cost price of the manufacture may advantageously be reduced.

While particular embodiments of the invention have been shown and described for a purpose of illustration, other arrangements and embodiments may be practiced by those skilled in the art without departing from the scope and spirit of the invention.

What we claim is:

1. An alternating current limiting apparatus comprising:

a first circuit formed of a series combination, of a capacitor and a winding means, connected between two different kinds of power systems;

a second circuit formed of a series combination, of a first resistor and a closing device, connected across the output terminals of said winding means;

and a third circuit formed of a series combination, of a reactor and a second resistor, connected in parallel with said first circuit;

said closing device of said second circuit being normally kept in its open state to form a series resonance circuit of said winding means and said capacitor and to interconnect said systems with the resultant impedance of said first circuit being zero, while upon system faults said closing device of said second circuit being closed to switch the impedance as seen from the input terminals of said winding means over to a predetermined small value to detune the resonance point of said series resonance circuit, thereby forming a parallel resonance circuit between the series combination of the small impedance with said capacitor and said third circuit to enlarge the total impedance value between said systems with an overcurrent therebetween being suppressed.

2. An alternating current limiting apparatus according to claim 1 wherein said winding means comprises a transformer the primary winding of which is serially connected to said capacitor, and said first resistor and said closing device of said second circuit are connected in series across the secondary winding of said transformer.

3. An alternating current limiting apparatus according to claim 1 wherein said winding means comprises an autotransformer, and said first resistor and said closing device of said second circuit are connected in series across the output terminals of said autotransformer.

4. An alternating current limiting apparatus according to claim 2 wherein said winding means comprises a second reactor, and said first resistor and said closing device of said second circuit are connected in series across the output terminals, which are also input terminals, of said second reactor.

5. An alternating current limiting apparatus according to claim 1, wherein, provided that the angular line frequency of said systems be $\omega$, the inductance of said reactor be $L_3$, the capacitance of said capacitor be c, the number of turns between the output terminals of said winding means be $n_2$, and the resistances of said first and second resistors be $r_2$ and $r_3$ respectively, the following relationships are provided:

$$\frac{\omega \cdot L_3}{r_3^2 + \omega^2 \cdot L_3^2} = \omega \cdot c, \ \omega \cdot L_3 >> r_3 \text{ and } r_2 \cdot c/n_2^2 \cong 0$$

* * * * *